United States Patent [19]

Kessler

[11] Patent Number: 4,657,673
[45] Date of Patent: Apr. 14, 1987

[54] DUAL FILTERING SYSTEM FOR SWIMMING POOLS

[76] Inventor: Emerich Kessler, 28 Lakeview Dr., West Orange, N.J. 07052

[21] Appl. No.: 799,636

[22] Filed: Nov. 13, 1985

[51] Int. Cl.$^4$ ............................................. B01D 29/38
[52] U.S. Cl. .................................. 210/108; 210/117; 210/169; 210/193; 210/333.01; 210/416.2
[58] Field of Search ................... 210/108, 169, 333.01, 210/333.1, 340, 117, 118, 119, 416.2, 193, 275, 278

[56] References Cited

U.S. PATENT DOCUMENTS

| | | |
|---|---|---|
| 3,100,190 | 2/1961 | Hobson, Jr. . |
| 3,642,141 | 2/1972 | Hobson, Jr. . |
| 3,859,214 | 1/1975 | Lang et al. . |
| 3,907,686 | 9/1975 | Fletcher et al. . |
| 3,954,621 | 5/1976 | Etani et al. . |
| 3,969,248 | 7/1976 | Whitmer . |
| 3,984,327 | 10/1976 | May . |
| 3,986,958 | 10/1976 | Cattano . |
| 4,043,917 | 8/1977 | Rowley et al. . |
| 4,134,836 | 1/1979 | Rowley et al. . |
| 4,263,139 | 4/1981 | Erlich . |
| 4,330,401 | 5/1982 | Boze et al. . |
| 4,427,551 | 1/1984 | Duveau . |
| 4,472,281 | 9/1984 | Kerridge . |

Primary Examiner—Frank Sever
Attorney, Agent, or Firm—Morgan & Finnegan

[57] ABSTRACT

A dual filtering system, especially for swimming pools, in which dirt and any large particulates are removed by passing a liquid feed through said filter bed and minute impurities are then removed by passing the liquid filtrate through a multiplicity of vertically aligned, diatomaceous earth filter grid units. This permits the diatomaceous earth filter grid units to be operated for a protracted period of time with little, if any, need to backwash them. The filter grid units and the sand filter bed are disposed within a single tank in separate zones, one located above the other in a spaced, coaxial arrangement. The pressure differential between the two zones is automatically regulated during filtration by a check valve means. Each of the filter grid units is removably connected to radial arms of a manifold assembly and spaced apart from another. The grids are comprised of a rigid, sock-like pervious filter tube tightly fitted over a rigid, perforated tubular frame. This arrangement prevents adjacent grid units from tangling and losing effectiveness and also permits quick, easy removal and/or replacement of individual filter grid units.

9 Claims, 4 Drawing Figures

DUAL FILTERING SYSTEM FOR SWIMMING POOLS

BACKGROUND OF THE INVENTION

1. Field of the Invention

This invention relates to a dual filtering system by which fluids may be clarified by separating constituents suspended in the fluids from a filtrate. More particularly, this invention relates to a dual filtering system by which a liquid or gas may be cleansed of suspended particles by passing the liquid or gas, under a pressure differential, serially through a sand filter medium and a diatomaceous earth filter medium which transmit the fluid and capture the particles.

2. Description of Prior Art

Filtering systems for filtering fluids, such as water for use in a swimming pool or the like, are well known and include those types in which sand, diatomaceous earth (DAE), flexible foams such as polyurethanes and polyamides, or pleated polyester cartridge filter mediums are employed.

In sand filtration systems, water from the pool is pumped through a bed of sand and collected by an underdrain, into which the water, but not the sand, can pass. The upstream surface of the sand bed often becomes clogged by large particles and an impermeable layer forms on the upstream surface. The resultant increased pressure drop across this impermeable layer decreases the filtration rate until filtration almost stops requiring the cleaning or replacement of the sand before it has been permeated by the smaller particles.

In DAE filtration systems, a pressure differential in the fluid being filtered is maintained at opposite sides of each DAE filtering element. The DAE filter elements may be in the form of porous or finely perforated, vertically aligned, curved rectangular plates or cylindrical tubes. In the operation of such filter elements, fluid containing DAE particles in suspension is forced through the porous filter plates or tubes and DAE particles accumulate on the surface of the plates or tubes so as to reduce the size of the interstices or perforations on the plate or tube wall and thus enhance the filtering operation and ensure the removal from the fluid of particles suspended therein. It is necessary periodically to remove accumulated DAE particles from the filter plates or tubes to prevent clogging thereof.

The plates comprise one or more hollow, rectangular inner support elements, which are perforated in a grid-like pattern. The elements are radially equidistantly disposed about an axis parallel to the longitudinal axis of the rectangular plate, and have one or more longitudinal support ribs. The inner support element is encased within an outer, fine mesh polyester cloth which passes water but retains the DAE particles. In operation, when the filtering cycle is stopped, the accumulated DAE layer falls off the outer surface of the plates. However, it has been found that accumulated DAE particles tend not to fall off at the corners and sides of such outer surfaces.

The tubes may comprise one or more layers of fine mesh wire screen mounted on rigid supports such as wire frames and often the DAE powder or the like accumulates and builds up in the spaces between the tubes. The removal of the accumulated layer of powder or "sludge", is usually effected by a so-called backwash operation wherein liquid is forced through the tubes in the direction opposite to that in which the liquid flowed during the filtering operation. It has been extremely difficult and sometimes impossible, to completely remove the accumulated layer of powder from the tubes, and too often the sludge builds up or "bridges" in the spaces between the tubes which seriously interferes with the removal of sludge from the filter. Sometimes, means has been provided for mechanically removing the sludge from the filter by vigorously shaking or tapping the tubes, but this operation not only fails to accomplish a satisfactory removal of the layer of diatomaceous earth, but also may result in damage to the tubes, for example, cracking or puncturing thereof.

U.S. Pat. Nos. 3,100,190 and 3,642,141, both to Hobson, Jr. describe tube sheet assemblies wherein a plurality of flexible tubes are placed within corresponding openings in a cover plate and their top ends affixed to the cover plate. The tubes are vertically aligned and densely packed in this arrangement. Each tube has a sock-like outer side wall which is woven to permit liquid to pass through openings therein and which is flexible. Each tube also has an inner porous frame which is of smaller diameter than the diameter of the side wall and also may be inherently resilient along its longitudinal axis to permit the outer tube to be bent during a filtering operation. Because of this construction, the tubes will change in length and in diameter in response to changes in the pressure of the backwash liquid and thereby allegedly will loosen an accumulated outer layer of DAE or similar "filter aid" from the wall of the tube and cause the dislodged layer to fall away from the tube by gravity. Removal of the accumulated layer of "filter aid" or DAE from the tubes is further facilitated by so-called "bumping" of the tubes, i.e., causing rapid up and down movement of the tubes which in turn causes the tubes to sway and shake until dislodged material falls off.

In practice, however, it has been found that the flexible nature of such tubes causes them to tangle and interlock with one another such that: (1) the "bumping" does not dislodge accumulated layers of "filter aid"; (2) they cannot be easily removed from the tube sheet which holds them and thus cannot be easily and separately cleaned and/or repaired; and (3) they lose about 30% of their available surface area for filtration, thereby reducing efficiency of the filtration. Moreover, the loose fitting slidable relationship between the outer side wall and the inner support frame permits opening of the woven side wall and allows DAE particles to be passed through the tubes back to the pool during the initiation of a filter cycle. Also, movement of the flexible tubes during filtering interferes with the desired accumulation of a uniform DAE layer on the tube side wall.

U.S. Pat. No. 3,954,621 to Etani et al. describes a filtration system comprising a thin pre-filter medium made of an open celled polymeric foam or a nylon woven mesh or fabric and a thick main filter medium also made of an open-celled polymeric foam, e.g., polyurethane. The pore size of the pre-filter medium is no greater than the pore size of the main filter medium.

An object of the present invention is to provide a dual filtering system providing both sand and DAE filtration. Another object of the present invention is to provide a dual filtering system in which dirt and any large particulates are removed by passing a liquid feed through a sand filter medium and minute impurities are then removed by passing the liquid filtrate through a DAE filter medium.

It is an object of this invention to provide a dual filtration system comprised of sand and DAE filter mediums in which the DAE filter medium is protected from large debris in the liquid to be filtered, thus permitting the DAE filter medium to be operated for a protracted period of time with little, if any, need to backwash the DAE filter medium.

Still another object of this invention is to provide a dual filtration system which is simple and economical to operate and maintain.

Another object of this invention is to provide a dual filtration system for swimming pools which has the ability to remove minute particles from pool water and thereby lower the cost of chemicals otherwise needed to clean the water of these particles.

An object of the present invention is to provide a dual filtering system in which DAE filter units and a sand filter are disposed within a single tank in separate zones, one located above the other in a spaced, coaxial arrangement.

Still another object is to provide a dual filtering system having two separate zones of filtering, one above the other, in which the pressure within the two zones is automatically regulated.

An object of the present invention is to provide a dual filtering system including a sand type and a DAE type filter, the DAE filter comprised of a multiplicity of vertical filter grids, each of which is removably connected to radial arms of a manifold assembly and spaced apart from another, the grids comprised of a rigid, sock like pervious filter tube tightly fitted over a rigid, perforated tubular frame, the external surfaces of the grid units capable of being coated with a layer of DAE upon application of pressure, the DAE coating becoming easily dislodged upon removal of the pressure.

Other objects and advantages of the invention will be apparent from the accompanying drawings and description, the essential features of which are set forth herein in the appended claims.

BRIEF DESCRIPTION OF THE DRAWINGS

In the accompanying drawings.

DETAILED DESCRIPTION OF INVENTION

Figure 1:
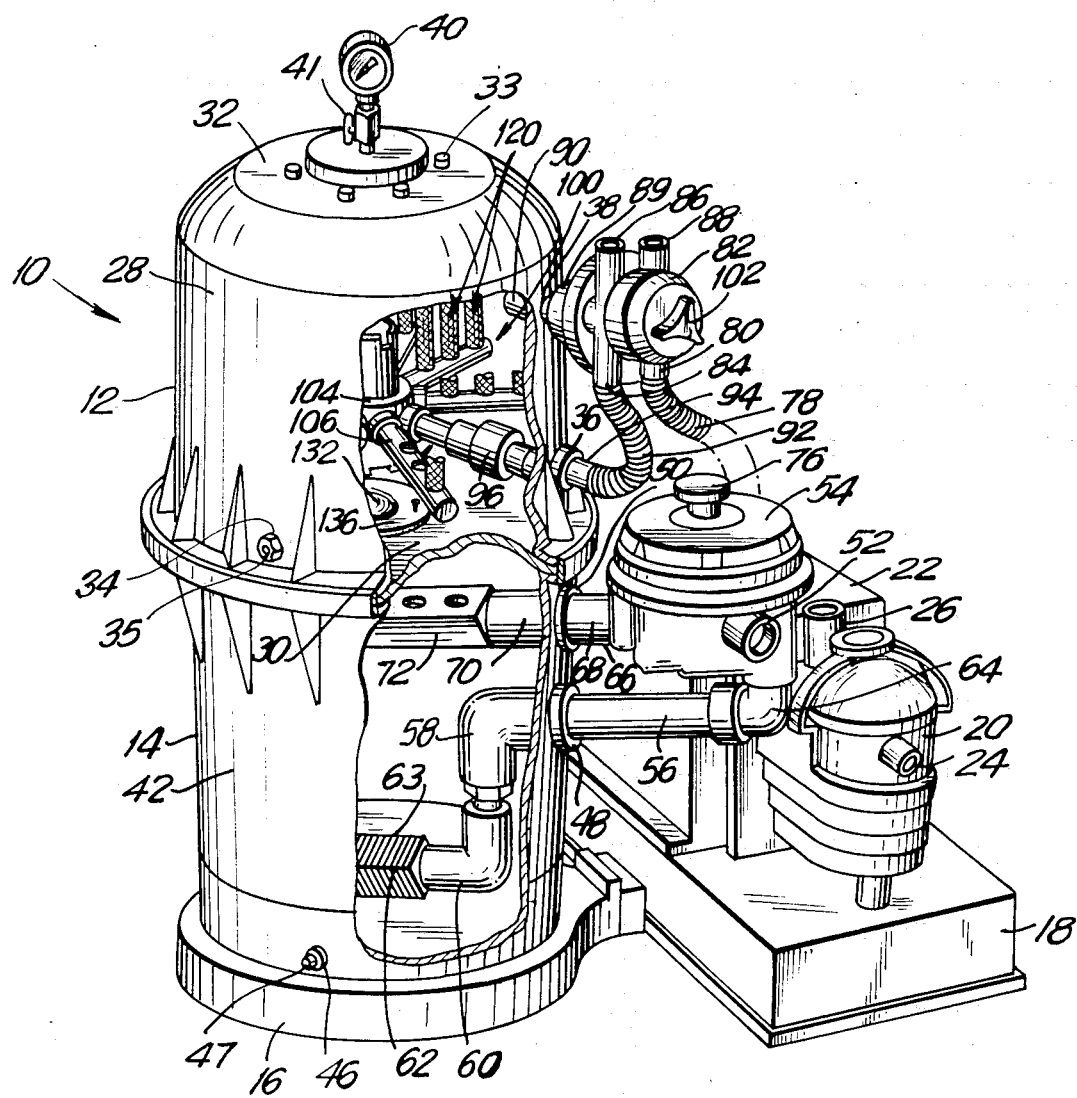
FIG. 1 is a view in elevation and perspective of a filter system in accordance with the invention showing the exterior tank and pump, motor, valve and conduit lines associated therewith and partially broken away to show in detail a central manifold, the arms radiating therefrom, and a multiplicity of vertical filter grid units connected to the arms which are situated in the upper interior filtration zone of the tank and a diffuser member and underdrain member in the lower interior filtration zone of the tank.

For purposes of illustration, the filtering system of the present invention will be described in connection with a swimming pool system in which the filtering system filters the pool water. Referring to FIG. 1, the filtering system of the present invention comprises a tank or container 10 having an upper portion 12 and a lower portion 14 which are generally cylindrically shaped. The tank 10 is shown mounted on a generally cylindrically shaped pedestal or support base 16 which in turn is formed integral with, or connected to, a skid 18. Also shown secured on the skid 18 are pump 20 and motor 22. The pump 20 is driven by the motor 22 to pump water in through an inlet 24, formed on the pump housing, and out through an outlet 26, also formed on the pump housing, to the tank 10.

Pump 20 is of a size and capacity which is capable of handling relatively large solid particles of up to 5 cm in diameter. Use of a vortex or centrifugal pump is preferred, although pneumatically actuated diaphragm pumps and turbine pumps can be adapted for use in the system. The selection of suitable pumps will be apparent to one familiar with the art and is exemplified by the equipment described in Perry's *Chemical Engineer's Handbook* (5th Ed) pp. 6-5 through 6-14, the disclosure of which is herein incorporated by reference.

The upper tank portion 12 includes a side wall 28 which preferably is cylindrically shaped, a plate 30 disposed at the lower end of side wall 28 and forming the bottom of tank portion 12 (and top of tank portion 14) and a removable cover 32 at the upper end of side wall 28 and coaxially aligned therewith. The cover may be secured to the upper body portion 12 of the tank 10 with an O-ring (not shown) disposed therebetween around the peripheral edges of the cover 32 for a liquid tight seal. The cover 32 is secured by bolts 33 through holes on cover 32. The cover 32 may be generally dome shaped and is shown in the form of a substantially planar surface which comprises a material which is transparent or translucent to light, e.g. glass, polycarbonate, polyvinyl chloride, polyetherimide, or the like, so that the interior tank 12 can be viewed.

Side wall 28 contains outlet ports 34 and 36 in its lower portion and an inlet port 38 in its upper portion. A plug 35 and O-ring (not shown) extends into and seals outlet port 34. A pressure gauge 40 having a manual air release valve 41 is shown mounted on cover 32. The pressure gauge 40 measures the pressure differential across the filter medium within the interior of the tank portion 12.

The lower tank portion 12 includes a side wall 42 which preferentially also is cylindrically shaped, a bottom wall 44 at the lower end of side wall 42 and plate 30 at the upper end of side wall 42. Side wall 42 contains outlet ports 46 and 48 in its lower portion and an inlet port 50 in its upper portion. A plug 47 and O-ring (not shown) extends into and seals outlet port 46. Plugs 35 and 47 may be removed to drain the upper and lower tank portions 12 and 14, respectively.

The upper body portion 12 may be secured to the lower body portion 14 with an O-ring (not shown) tank gasket disposed therebetween for a liquid tight seal and an outer sealing ring 39 circumferentially applied about the lower circumferential edges of body portion 12 and tightened with a nut and bolt (not shown) to provide the seal. Plate 30 is disposed between and divides body portions 12 and 14 into two separate filtration zones. Plate 30 may comprise stainless steel or a moldable plastic such as those used for tubular support frame 124 described herein after. The circumferential edges of plate 30 rest upon an annular ledge portion (not shown) formed as part of the tank portion 14 at its upper end.

Flexible hoses or conduits are typically employed to transport pool water to be filtered to and from the filtering system 10. A conduit (not shown) having one end in communication with the pool is connected at its other end to inlet 24, for example, using a hose clamp. Another conduit (not shown) has one end thereof connected to outlet 26 of pump 20, e.g., via a hose clamp (not shown) and is connected at its other end to an inlet port 52 of six-way multiport valve 54. A conduit 56 extending from outlet port 48 and forming part of the housing of valve 54 has a threaded end (not shown) extending through outlet port 48 of tank portion 14 and is connected to a threaded opening in a coupling conduit line 58 within tank portion 14, coupling conduit line 58 in turn threadably connected to a threaded opening in a coupling arm 60 forming part of underdrain 62.

The underdrain 62 is shown as including a rectangular collecting element provided with narrow slits 63 to make it permeable to water but not substantially permeable to sand. The shape of underdrain 62 also may be cylindrical, hexagonal or the like.

Valve 54 has two inlet ports 52 and 64 and four outlet ports (one being outlet port 66 and the others not shown). A conduit arm 68 extending from outlet port 66 and forming part of the housing of valve 54 has a threaded end (not shown) extending through inlet port 50 of tank portion 14. The threaded end of conduit arm 68 is connected (with associated washers) with one of the threaded ends of coupling 70. The coupling of conduit arms 56 and 68 with coupling elements 58 and 70, respectively, secures valve 54 against the exterior of tank portion 14.

The other threaded end of coupling 70 is connected to threaded end of a diffuser element 72 having a plurality of openings 74 in its upper surface for distributing fluid, e.g. pool water, in a generally upwards direction in the interior of tank portion 14. Connected to respective outlet ports (not shown) of valve 54 are a return conduit line (not shown) which recycles water to a pool, a waste conduit line (not shown) which discharges contaminated water to waste, and a conduit line 78 connected to an inlet port 80 of valve 82.

A valve handle 76 on the housing of valve 54 is rotatable into six positions for diverting the fluid, e.g. pool water: (1) filter; (2) backwash: (3) closed; (4) recycle; (5) drain; and (6) waste, as more fully described hereinafter. Valve assemblies which are suitable for use as the four way or six way multiport valves 54 and 82 in the filtering system of the present invention are known and include those described in U.S. Pat. Nos. 3,721,268 to Erlich et al.: 4,105,555 to Pease; or 4,328,833 to Aurther, the disclosures of which are incorporated herein by reference.

Valve 82 has two inlet ports 80 and 84 and two outlet ports 86 and 88 for connection to two respective fluid outlet conduit lines. Valve 82 has a threaded nipple end 89 which extends through inlet port 38 of tank portion 12. The nipple 89 forms part of the housing of valve 82 and secures valve 82 against the exterior of tank portion 12. The nipple 89 threads into a threaded opening in a coupling 90 located within tank portion 12 and having a threaded inlet and associated washers (not shown). A conduit line 92 has one end thereof connected to a nipple 94 extending through outlet port 36 of tank portion 12, the nipple 94 forming the outer end of a hollow conduit arm 96 radially extending from a filter grid unit and manifold assembly 100 which is shown in detail in FIGS. 1 and 2. The other end of conduit line 92 is connected to a second inlet port 84 of valve 82.

A valve handle 102 on the housing of valve 82 is rotatable into four positions for diverting a fluid such as pool water: (1) filter; (2) backwash; (3) drain; and (4) waste, as more fully described hereinafter.

Centrallly disposed within and located at the lower end of tank 12 is filter grid unit and manifold assembly 100 which is comprised of a central manifold having a central hub 104 with a plurality of hollow arms 106 extending radially therefrom. The central hub 104 is hollow, cylindrically shaped and has a side wall 108 with a plurality of ports 110 therein and equally spaced apart from one another. Each of the ports has a threaded inlet or socket 112 forming part of the housing on the hub 104 and is adapted to receive a mating threaded end 114 of a hollow support arm 106 (FIG. 2) or a threaded end (not shown) of outlet conduit arm 96. The support arms 106 and cutlet conduit arm 96 extend radially from the side wall 108 of the central hub 104 in a plane perpendicular to the longitudinal axis of the hub 104.

Each of the support arms 106 has a plurality of openings 116 therein spaced apart from one another, preferably equidistantly, in an upper portion of the arm 106. The spacing is selected so as to permit grid units 120 to be coupled to the arms 106 in a vertical array wherein adjacent grid units 120 do not touch one another duing filtration. Each of the openings 116 has a threaded inlet or socket (not shown) forming part of the housing of the hub 104 and is adapted to receive a threaded end 118 of a filter grid unit 120.

In the event that one of the filter grid units 120 or one of the arms 106 or 96 of the central hub 104 require cleaning or replacement, each individual filter grid unit 120 or arm 106 or 96 may be separatedly uncoupled, i.e., a grid unit 120 may be uncoupled from an arm 106 and an arm 106 may be uncoupled from the central hub 104 and a new replacement grid unit 120 coupled to an arm 106 or an arm 96 coupled to central hub 104 (via threaded ends), to effect a quick and simple change of some or all of the components of the filter grid unit and manifold assembly 100.

Each of the filter grid units 120 comprises a sock-like pervious filter tube 122 fitted over a perforated, tubular frame 124. The outlet filter tube 122 is braided or woven of long flexible fibers of suitable material such as Dacron polyester, glass, polyimide, polytetrafluoroethylene, polyvinyl chloride, stainless steel, or the like. The threaded end 118 of filter grid unit 120 is open and the other end 126 is closed. In the embodiment shown, the strands are bonded together at the closed end 126 by means of heat sealing. The material of which the tube 122 is formed may be either yarn-like or monofilament. The surface of each tube 122 provides a fine mesh outer layer sufficiently fine to receive and hold a layer of diatomaceous earth particles.

The filter tube 122 may be formed of interlaced or braided, non-elastic but flexible, thin rod or wire-like strands of material that are chemically inert to the liquids to be filtered and to the DAE particles. While the construction of the filter tube 122 may be varied, in one embodiment, the filter tube 122 comprises strands woven with a "basket" weave in which a plurality of groups of strands, each group including a plurality of strands of small diameter, for example, 0.008 inch, are braided with the strands running helically of the tube wall and with the groups of strands braided in a "plain" or "over two—under two" weave, which is frequently used in making tubular braided structures. For convenience in manufacture, the strands may be braided on known machines so that the angle of the strands of each group of strands with the diametral plane of the tube 122 is about 45° so as to balance the end and side wall pressures and produce a stable construction which will neither swell nor elongate under pressure.

The outer tube 122 is supported by a rigid, nonflexible perforated tubular support frame 124 preferably formed of a moldable synthetic plastic material such as polyethylene, polypropylene, polysulfone, polycarbonate, acrylonitrile-butadiene-styrene (ABS) or acrylonitrile-chlorinated polyethylene-styrene (ACS), acrylic-styrene-acrylonitrile (ASA) polymers, and the like. Suitable moldable plastic materials also are believed to include fluoroplastics (e.g., polytetrafluoroethylene), phenylene ether copolymers, polyamide imide, polybutyleneterephthalate, polyetheretherketone, an acetal homopolymer, polyoxymethylene (commercially available from E.I. duPont de Nemours & Co., Washington, Del. 19898, under the trade name Delrin), acetal copolymers (commercially available from Celanese Engineering Resins, 86 Morris Avenue, Summit, N.J. 07901, under the trade name Celcon), and epoxy glass resins and the like.

The support frame 124 has a plurality of openings 128 therein extending through its walls in spaced apart relation longitudinally and circumferentially thereof. The openings 128 are sufficiently large to permit passage of water through the frame 124 without build up of pressure in the tank portion 12 but not sufficiently large to provide the support frame 124 with inherent resiliency along its longitudinal axis. The support frame 124 is dimensioned to nest snugly within outer tube 122 in a non-sliding, tight-fitting relationship.

Figure 2:
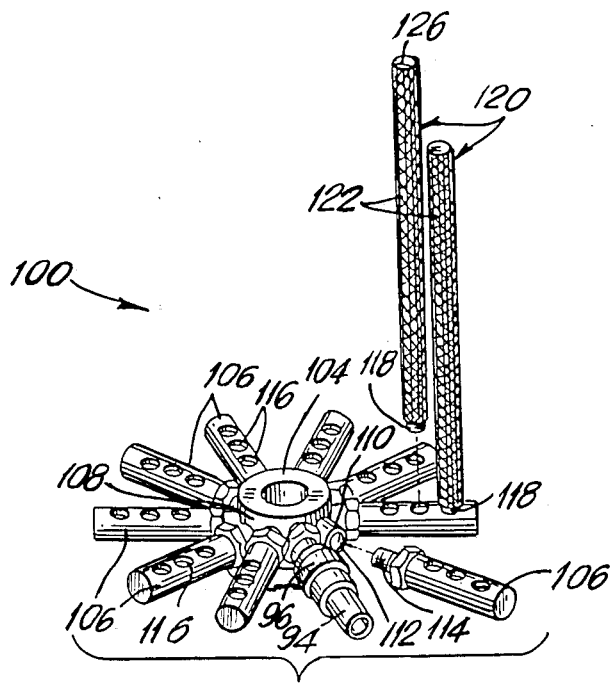
FIG. 2 is a view in elevation and perspective detail of the manifold assembly of FIG. 1 showing: a threaded end of one of the filter grid units removably coupled to a mating threaded opening in one of its radially extending arms; one of the filter grid units prior to being removably coupled to one of the arms of the manifold assembly; and one of the arms prior to being removably coupled to one of the threaded inlet ports of the manifold.
Figure 3:
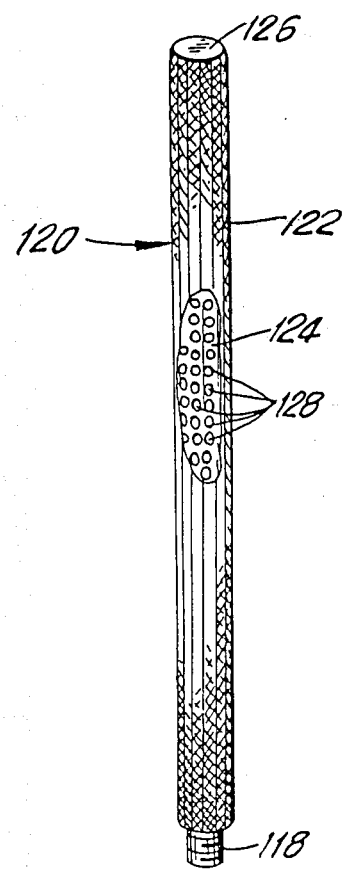
FIG. 3 is a lateral view in elevation and perspective of a filter grid unit in accordance with the invention which has been partially broken away to show the rigid, cylindrically shaped, interior perforated support frame and the outer woven or braided tubular covering for the support frame.
Figure 4:
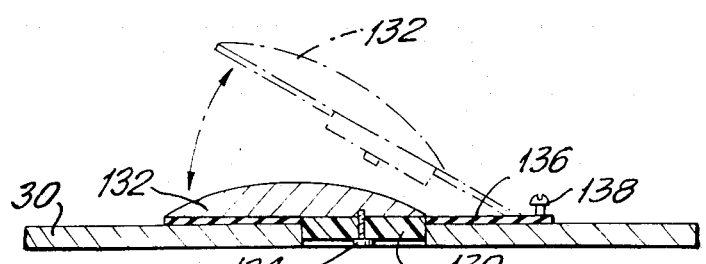
FIG. 4 is a side view in elevation and partially in cross section of a check valve in the plate dividing the tank shown in FIG. 1 and showing in broken lines the check valve in an open position.

The outlet conduit arm 96 comprises a unitary member or one or more elements which may be coupled together with suitable sealing means such as rubber washers to form a unitary member. Referring now to FIGS. 1 and 2, the outlet conduit arm 96 comprises a series of threaded elements which are coupled together to form a unitary assembly. One end of the outlet conduit arm 96 is threaded into inlet port 110 within the side wall of central hub 104. The other end 94 which is not threaded extends through outlet port 36 of tank portion 12 for connection to one end of conduit 92, shown as a flexible hose in FIG. 1. When it is desired to remove filter unit and manifold assembly 100 from tank portion 12, conduit arm 96 is decoupled from the hub 104, tank ring 39 is decoupled and the upper tank portion is removed. The assembly 100 may then be removed.

The base of the central hub 104 rests within the interior of tank portion 12 above plate 30. An annular groove or depression 105 extends diametrically across the circular cross-section of the base of the central hub 104 to permit release of air which may become trapped under the base.

Plate 30 has an opening 31 therein, preferably centrally disposed therein for permitting air entrained in fluids in the body portion 14 to be released into body portion 12 where they may be subsequently released via air release handle 41. A check valve means comprising a plastic sealing member 130 which is adopted to received in opening 31 in a mating relationship and seal the opening 31 in plate 30. Disposed on sealing member 130 is a weight 132, e.g., a lead weight, which is attached to sealing member 130, e.g., via screw 134. Attached to a side wall of sealing member 130 is a pivot arm 136. Preferably made of an elastic material, e.g., rubber, the end of the arm 136 which is not attached to the sealing member 130 is fixedly attached to plate 30, e.g., via screw 138.

The filter grid units 100 preferably are cylindrically shaped but it is believed that polygons, e.g., an octagon or decagon also would be suitable shapes.

In normal operation, both sand and DAE filters are employed. However, either filter can be separately used as well, depending on the particular filtering needs. For example, when used to filter pool water, early season pool clean up may be carried out using only the sand filter, thus protecting the DAE filter grid units from introduction of large debris. The filtering system of this invention is adapted to permit backwashing of the sand filter alone as well. Once the large debris has been removed, the DAE filter grid units are used in combination with the sand filter to remove smaller particles and the filtrate may be recycled to the pool. Alternately, the sand filter may be by passed so that only the DAE filter grid units are used for filtering a liquid or in a backwash cycle.

When both filters are employed, valves 54 and 82 are placed into their respective filter positions. This permits pool water or the like to be drawn by pump 20 from the pool to pump inlet 24, through a conduit (not shown) connected to the pool and the pump inlet 24, and through pump outlet 26, a conduit (not shown) connecting outlet 26 and inlet 52, arm 68, coupling 70 and diffuser 72. Then, the water is distributed in tank portion 14 through a plurality of openings 74 in the diffuser 72. The water preferably is introduced and distributed in tank portion 14 in an upwards direction to flow toward the top of tank portion 14 (defined by plate 30) and then flows downward through the sand filtration bed (not shown). The sand filter bed removes particulate matter sized greater than about 50 microns. Filtered water is collected by underdrain 62 which passes filtered water but not sand particles through slits 63 in underdrain 62. The filtered water flows through outlet conduit 60, coupling 58, exit port 48, conduit 56, into valve inlet 64 and out one of the outlets of valve 54 through conduit 78, inlet 80 of valve 82, and outlet arm 89, inlet port 38, coupling 90 into the upper end of tank portion 12.

In the tank portion 12, water is caused to flow by the suction action of pump 20 into the hollow filter grid units 120, the water being filtered of minute particles of 1 micron or greater in size by the DAE filter layer coating the exterior surfaces of filter grid units. The water passes through the plurality of vertical filter grid units 120 into support arms 106 and out of exit port 36 of tank portion 12 through conduit arm 94, and through conduit 92, inlet port 84 and outlet port 86 of valve 82.

Initially, a slurry of DAE particles and pool water is introduced into the tank portion 12 to be deposited uniformly over the surfaces of the filter grid units 120. This precoates the surfaces of the filter grid units 120 with a layer of DAE particles. Typically, a minimum quantity of about 1 pound of DAE per 9 filter grid units 120 (typically having a diameter of about ¾ inch and a length of 11 inches) is fed into the tank portion 12.

DAE, also known as diatomite, diatomaceous, silica, kieselguhr and infusorial earth is composed predominantly of the skeletal remains of microscopic single-celled aquatic plants called diatoms. Physically, the diatom skeleton is an intricate structure having many submicron pores that occur, like snowflakes, in a large variety of shapes, no two being the same. DAE particles are typically sized between 10 to 200 micrometers (microns) in diameter and although they are as fine as cake flour in appearance, they have intricate and varied shapes. These irregular characteristics allow a free passage of water through a layer of DAE particles but filter out contaminants sized greater than about 1 micron.

After the DAE particles have coated the vertical filter grid units 120, a pre-coat pressure is read using the pressure gauge 40. The filtering cycle begins as soon as the filter grid units 120 have been pre-coated. A feature of the present invention is that there is little, if any, need to backwash the DAE particles, since the sand filter bed removes most of the dirt and impurities. The extent of any contaminant accumulations may be readily measured by gauging the pressure drop across the filter grid units 120 with pressure gauge 40. The pressure drop at a given point signals that the filter grid units 120 are not functioning effectively or that the pump 20 being used to move the pool water is insufficient to effect movement against the pressure drop experienced by the filtering grid units 120 and in the tank portion 12. Typically for a 1 Horsepower pump, if the pressure drop rises 7-10 psi above the pre-coat pressure, it is preferred to regenerate the filter grid units 120.

According to the filtering system of the present invention, the sand bed may be backwashed by stopping the pump 20, and placing valve 54 in the "backwash" position . In the "backwash" cycle for the sand bed, water is caused to flow upwardly through the sand bed in such a manner that accumulated contaminants coating the sand particles are flushed free and are directed to a waste line for disposal. Flow of water through the filtering system then follows the following path through inlet 24, outlet 26, inlet 52, outlet line 64, conduit 56, port 48, coupling 58, arm 60, and underdrain 62, then upwards through the sand bed in tank portion 14, and through diffuser 72, coupling 70, port 50, outlet conduit 68, into and out of valve 54, and is discharged to waste through a conduit line (not shown) connected to valve 54. After this "backwashing" cycle for the sand bed, the valve 54 and 82 are each placed in the "filter" position, and the pump is restarted to resume normal filtering operation.

When the valve 54 is placed in a recycle position, flow of water is as follows: through inlet 24, outlet 26, inlet 52, conduit 78, inlet 80 of valve 82. The four-way valve 82 can then direct the flow of water through the filter grid unit and manifold assembly in tank portion 12 in a filtering cycle, as described previously herein, in a backwash cycle (where flow of water in and out of the tank portion 12 is the reverse of the filter cycle, and the backwashed water is discharged via a conduit connected to outlet 88), a waste cycle where flow of water is caused to by-pass the tank portion 12 and exits through a conduit line (not shown) attached to outlet 86, and a drain cycle where flow of water is caused to by-pass the tank portion 12 and exits through a conduit line (not shown) attached to outlet 88.

Valve 54 has a "closed" position which stops low of water into and out of tank portions 12 and 14 and facilitates disassembly of tank portion 12 from tank portion 14. Individual filter grid units 120 and/or support arms 106 can be unthreaded and replaced in the grid unit and manifold assembly 100. Drain plug 35 may be removed from port 34 to drain water from tank portion 12 and drain plug 47 may be removed from port 46 to drain water from tank portion 14, if desired. Placing valve 54 in a closed position also facilitates removal of cover 32 so that individual grid units 120 may be removed (and cleaned or replaced) by uncoupling (and subsequently recoupling) their respective threaded ends 118 from respective threaded openings 116 in arms 106.

The "waste" position of valve 54 permits power vacuuming of a very dirty pool or one that has been flocced so that the collected water can be discharged. It is further sometimes desired by pool owners to rinse the waste line until residual contamination therein as been flushed out, or, to have a forceful, albeit unfiltered, flow of water for therapy pools, or spas.

In the "drain" position of the valve 54, the motor 22 may be shut off and pool water will flow by gravity from the pool through inlet 24, outlet 26, inlet 52 and will discharge from an outlet line (not shown) connected to valve 54. In the drain position, the pool level will be lowered up to the skimmer (the level where the other end of the fluid conduit line coupled to the inlet of the pump is situated). The "drain" position of valve 82 also may be employed for this purpose when the valve 54 is in a "recycle" position. Water then is caused to flow into (by gravity) into inlet 80 and out a conduit line connected to outlet 86 of valve 82.

Backwashing of the DAE vertical filter grid units is infrequently required with the filtering system of this invention. In the backwash position of valve 82 and the recycle position of valve 54, pool water is directed through inlet 24, outlet 26, inlet 52, conduit 78, inlet 80, inlet 84, conduit 92, conduits 94, conduit arm 96, port 110, openings through grid units 120 and out of tank portion 12 through coupling 90, port 38, arm 89 and out through the conduit attached to outlet 88. Accumulated contaminants coating the DAE layer are flushed free of the vertical filter grid units 120. After thus "backwashing" the vertical filter grid units 120, before the valve 82 is turned back to the "filter" position, and fresh DAE particles are added to the tank portion 12 to pre-coat the filter grid units 120.

It also has been found that the DAE filtering cycle is further prolonged, without requiring a "bumping" of the filter grid units 120 or a backwash and regeneration of the DAE particles, by using the vertical filter grid units 120 of this invention. During the filtering cycle, the DAE particles in the pre-coat layer on the filter grid units 120 accumulate and trap a layer of contaminants on their outer surfaces, i.e., the surfaces that face the water to be filtered (the "upstream" surfaces). Each time the pump is stopped during a filtering cycle, the DAE particles fall to the bottom of the tank portion 12 (plate 30) due to gravity and their interconnection in the precoating layer. Each time the pump 20 is restarted, DAE particles within tank portion 12 reform a pre-coating layer on the outer surface of the filter grid units 120.

While not wishing to be bound by theory, it is believed that each time the pre-coating layer is reformed, the DAE particles reorient themselves in different spatial locations vis-a-vis the other DAE particles within the pre-coating layer. The reorientation of the DAE particles means that the make-up of their upstream surfaces is not the same as the make-up of the pre-coating layer during the previous segment of the filtering cycle. Fresh surface areas of the DAE particles which have not previously comprised the upstream surface of the precoating layer now comprise such upstream surfaces. This regenerates the filter grid units 120 during the filtering cycle of tank portion 12 and further extends the useful life of the DAE particles before a backwashing step is required.

During operation of the dual filtering system of this invention, it has been found that the pressures in the lower tank portion 14 increase faster than the pressures in tank portion 12. As air is entrapped with the feed liquid rises within tank portion 14. Applicant has found that when a check valve means is interposed between the upper tank portion 12 and lower tank portion 14, this substantially balances the pressure between the two filtration ones. When the conduit lines associated with the six-way valve 54 are $\frac{1}{4}$ inch larger in diameter than the conduit lines associated with the four-way valve 82, it has been found that the pressure in the tank portion 14 can be regulated by the check valve 130 so that it is no more than about 1 to $1\frac{1}{2}$ psi greater than the pressure in tank portion 12. However when valve 82 is also a six-way valve like valve 54, the conduit lines associated therewith are essentially equal in diameter. When the conduit lines are equal in diameter, it has been found that the pressure in the tank portion 14 can be regulated by check valve 130 so that it is no more than about $\frac{1}{2}$ up to 1 psi greater than the pressure in tank portion 12.

Tank portion 12 has an air release valve 38 to diffuse pressure within tank portion 12, when necessary. Compared to the DAE grid unit and manifold assembly 100 filtration zone, the pressure in the sand bed filtration zone builds up at a faster rate because of entrained air in the feed liquid which is being filtered therein. Pump 20 has to work harder to pump liquid through the sand bed filtration zone as the pressure builds up therein. This results in a reduced flow rate into the DAE filtration zone in tank portion 14. According to the present invention, the pressure differential between the two filtration zones is automatically regulated by means of check valve 130 which seals the opening 31 in plate 30 and prevents unnecessary backwash of liquids from the sand bed filtration zone.

In the embodiment shown, a lead weight 132 is used to hold check valve 130 in the opening 31 until the pressure in tank portion 14 exceeds the pressure in tank portion 12 by a preselected mount which pushes valve 130 upwards. Check valve 130 is pivotly mounted within opening 31 via pivot arm 136 and screw 138 in plate 30. When valve 130 is opened, the entrained air is released from tank portion 14 into tank portion 12 where it may be removed using air release valve 41. This balances the pressure differential between the two filtration zones, thereby increasing the flow rate of liquid into tank portion 12 and reducing the load on pump 20.

EXAMPLES 1(A)-1(D)

An experiment for water filtration was carried out with the filtering system shown in FIG. 1. Tank portions 12 and 14 were made of ABS with a transparent polycarbonate cover 32. Each tank portion 12 and 14 had a filter area of 18 sq. ft. The filter gird units 120 had an ABS tubular perforated support frame 124 encased within a woven tubular polyester mesh. Nine support arms 106 each holding three filter grid units 120 were in the DAE filter zone. Each filter grid unit was cylindrically shaped and had a length of 11 inches and a diameter of $\frac{3}{4}$ inch. Three lbs. of DAE were used to precoat the 27 filter grid units with a thin layer of DAE particles. A six-way valve 54 and a four-way valve 82 were used to control flow. Pressure gauges were connected to tank portions 12 and 14 to measure pressures therein.

"Dirty" pool water was manufactured by placing steel particles and 5 chlorine tablets approximately 4 inches in diameter and $\frac{1}{2}$ inch thick in 10 barrels each holding 55 gallons of water which was allowed to stand 8 weeks until the water turned a rust color.

(A) In one test, 5 of the barrels of rusted water were added to an above-ground swimming pool 18 ft. in diameter and holding about 3,000 gallons of crystal clear pool water. The presence of the rusted water was clearly visible in the pool. After 5 to 7 hours of filtering using the filtering system of this invention, the water was crystal clear again and remained so after 8 to 10 weeks of filtering with the filtering system of this invention. The pressure differential between tank position 14 and tank 12 rose 1 to $1\frac{1}{2}$ psi. The pressure in tank portion 14 rose 2 to $2\frac{1}{2}$ psi and the pressure in tank portion 12 rose $\frac{1}{2}$ to 1 psi during the 8 to 10 weeks of filtering.

(B) In another test, 5 barrels of rusted water were added to the above-ground pool used in Test (A). only the said filter was used, valve 54 being set to filter and an outlet conduit line connected to an outlet of valves 54. Dirt in the water was removed but not the rust color. After 5-7 hours of use, about 80% of the rust had been removed, but after 8-12 weeks, the rust color was still present in the pool. The pressure in tank portion 14 rose about 5 psi after 6-7 weeks and required backwashing.

(C) In another test, 5 barrels of rusted water was added to the above-ground pool used in Test (A). The sand filter bed was by-passed in this test and filtering took place only in the DAE filtration zone. After 5 hours, the filtered water was 99% free of the rust and dirt, but the filter units clogged and the pressure within tank portion 12 rose from 5 psi to 10 psi. This required backwashing the DAE particles right after adding the rusted water and daily backwashes for 10 weeks.

(D) Test (A) was repeated except that two, six-way valves 54 and 82 were used along with their associated conduit lines for a four-week period. The results were the same as Test (A) except that the pressure differential between tank portion 14 and tank 12 rose $\frac{1}{2}$ to 1 psi.

It is understood that the system of the present invention is not limited to use with swimming pools but is equally applicable to other environments requiring similar type filtering action.

The specific embodiments described above are intended to be representative and illustrative of the filtering system of the present invention which can be modified without departing from the spirit and scope of the invention which is to be determined by the following claims.

What is claimed is:

1. A dual filtering system comprising means designed for providing sand and diatomaceous earth filtration of fluids containing particulate matter suspended therein to separate the particulate matter from the fluids, the filtering system including:

a vessel having a first body portion disposed above a second body portion in a spaced, coaxial arrangement, said first body portion having a side wall, an open top and bottom, an inlet in an upper end of its side wall for receiving fluids to be filtered, and an outlet in a lower end of its side wall for discharging filtered fluids, said second body portion having a base, a side wall, an open top, an inlet in an upper end of its side wall for receiving fluids to be filtered, and an outlet in a lower end of its side wall for discharging filtered fluids;

a plate interposed between the lower end of said first body portion and the upper end of said second body portion, said plate having an opening therein;

a check valve means interposed in the plate openings and capable of permitting flow of fluids through said plate opening from the interior of said second body portion into the interior of said first body portion when the pressure in said second body portion exceeds the pressure in said first body portion by a preselected amount, said check valve means including a seal means for separating and sealing said first body portion from said second body portion;

said first body portion containing a filter grid unit and manifold assembly removably positioned on the lower end of said first body portion and comprising a central manifold having a hollow hub and a plurality of hollow support arms and a hollow conduit arm extending radially from, and symmetrically about, said hub in a plane perpendicular to the longitudinal axis of said manifold, said conduit arm being open at both ends and said support arms being open at one end, an open end of said conduit arm and the open end of each of said support arms being removably connected to said hub, each support arm having a plurality of threaded openings which are spaced apart from one another in an upper portion of said support arm said threaded openings adapted to be removably connected to respective threaded ends of a plurality of filter grid units and align said filter grid units vertically within said vessel and spaced apart from one another;

each of said filter grid units comprised of a perforated, tubular support frame open at both ends and having a rigid, non-flexible side wall, the perforations being large enough to pass unfiltered water therethrough, and a flexible outer sleeve encasing said tubular support frame, said outer sleeve formed of a synthetic plastic fiber braided or woven into a tubular shape and having a multiplicity of interstices therein which pass pool water therethrough but are small enough to prevent diatomaceous earth particles from passing through, said outer sleeve being tightly wrapped over, and sealed at both ends to said inner support frame providing a rigid, unitary structure therewith, said outer sleeve being open at one end and adapted at said open end to thread into an opening in one of said support arms, and said outer sleeve being closed at its other end;

means communicating the outlet of said second body portion with the open end of said conduit arm of said central manifold which is not connected to said hub;

said second body portion having disposed therein: a filter bed of sand, a diffuser element adapted for distributing fluids to be filtered into said second body portion, said diffuser element being close to the upper end of, and in communication with the inlet of, said second body portion, and an underdrain for removing filtered fluids but not the filtration material from the second body portion, said underdrain being close to the base of, and in communication with the outlet of, said second body portion;

pump means and associated conduit lines for causing said fluids to flow into and out of said first and second body portions and to first, second, third and fourth, outlet lines;

first valve means and associated conduit lines for controlling flow of fluids into and out of said first body portion and through said filter grid unit and manifold assembly into said first or second outlet lines and for controlling flow of fluids, by-passing said first body portion, into said first or second outlet lines;

second valve means and associated conduit lines for controlling flow of fluid into and out of said second body portion and through said sand filter bed into said third or fourth outlet lines or into said first valve means and for controlling flow of fluids by-passing said second body portion, into said first valve means or into said third or fourth outlet lines;

means separate from said first and second body portions for sealably attaching the bottom of said first body portion to the top of said second body portion; and means separate from said first body portion for providing a seal-tight cover for the upper end of said first body portion.

2. The filtration system of claim 1 wherein the check valve means comprises a weighted plastic member adapted to be sealably disposed in said plate opening and hingably mounted on said plate and opening whenever the pressure in said second body portion exceeds the pressure in said first body portion by said preselected amount and otherwise being closed and sealably disposed in said plate opening.

3. The filtering system of claim 1 wherein the tubular support frame is comprised of a moldable plastic material selected from the group consisting of polyethylene, polypropylene, polysulfone, polycarbonate, acrylonitrile butadiene-styrene, and the outer filter tube is comprised of a material selected from the group consisting of a polyester, glass, polyimide, polytetrafluoroethylene, polyvinyl chloride and stainless steel.

4. The filtering system of claim 3 wherein the tubular support frame is comprised of acrylonitrile-butadiene styrene or polypropylene and the outer filter tube is comprised of a polyester.

5. The filtering system of claim 1 wherein said filter grid units are cylindrically shaped.

6. The filtration system of claim 1 wherein said filter grid units are sufficiently strong to withstand a pressure differential of about 100 psi.

7. A dual filtering system comprising means designed for providing both sand and diatomaceous earth filtration by which dirt and any large particulates are removed from a liquid feed by passing the liquid feed through a sand filter medium and minute impurities are then removed by passing the liquid filtrate through a diatomaceous earth filter medium, including:

a tank having a removable cover having first and second body sections which are separated by a plate therebetween, each of said body sections having an inlet opening for receiving liquid to be filtered and first and second outlet openings for discharging liquid filtrate, said plate having an opening therein;

a check valve means interposed in the plate opening and capable of controlling flow of fluids through said plate opening from the interior of said second tank section into the interior of said first tank section when the pressure in said second tank section exceeds the pressure in said first tank section by a preselected amount, said check valve means including a seal means for separating and sealing the first tank section from said second tank section;

a central manifold disposed in the first body section of said tank, having an outlet means in communication with said first outlet opening of said first tank section and in communication with a plurality of filter grid units, said manifold including means for supporting the filter grid units relative to one another comprising a central hub having a cylindrical side wall, a plurality of support arms which are removably connected to and extend radially from the side wall of the central hub in a plane perpendicular to the longitudinal axis of the central hub, each of the support arms having a plurality of threaded openings therein which are spaced apart from one another and adapted to receive respective threaded ends of said filter grid units in said tank and vertically align said filter grid units in a densely packed but non-touching array;

said filter grid units disposed in said tank in the path of said liquid being rigid and stationary, each of said filter grid units comprising a perforated support frame, and a permeable filter tube, said tube being in the form of a braided, essentially non-extensible tubular member encasing and sealed to said support frame, and in registry therewith, said tubular member being closed at one end and open at its other end, said open end of said filter grid being threaded and removably connected to a threaded opening in one of said support arms; the interstices of said braided filter tube capable of passing liquid but not passing diatomaceous earth particles;

said second tank section having disposed therein: a filter bed of sand, a diffuser element adapted for distributing fluids to be filtered into said second tank section, said diffuser element being close to the upper end of, and in communication with the inlet of, said second tank section, and an underdrain for removing fluids but not the sand bed from the second tank section, said underdrain being close to the base of, and in communication with, a first outlet of said second tank section;

pump means in fluid communication with each of said inlet and outlet openings in said first and second tank sections for circulating liquid into and out of each of said first and second tank sections through said filter grid units and said central manifold in said first tank section and/or through a sand bed in said second tank section and also in fluid communication with outlet lines for passage externally of said system by-passing said first and/or second tank sections;

first valve means disposed between said pump means and said first tank section for controlling flow of said liquid into and out of said first tank section and through said filter grid units and central manifold and for controlling flow of said liquid by-passing said first tank section; and second valve means disposed between said first valve means, said second tank section and said punp means for controlling flow of said liquid into and out of said second tank section and through said sand bed filtration zone and for controlling flow of said liquid by-passing said second tank section.

8. The filtering system of claim 7 wherein said outlet means of said central manifold comprises a conduit arm open at both ends and having a threaded end which is removably connected to a threaded opening in said side wall of said central hub and extends radially therefrom in a plane perpendicular to the longitudinal axis of said central hub, the other end of said conduit arm extending through said tank outlet opening externally of said tank.

9. A dual filtration system comprising means designed for providing two separate zones of filtering a liquid containing particulate contaminants one filtering zone above the other, in which the pressure differential between the two zones is automatically regulated, including:

a. a tank having a fixed body in two sections which are separated by a plate therebetween the sections and a removable cover for a first one of said sections, each of said sections having an inlet port in its upper end and an outlet port in its lower end;

pressure balancing means establishing fluid communication between the first and second tank sections;

check valve means associated with said pressure balancing means and responsive to a preselected pressure differential between said first and second tank sections for controlling flow of fluids through said pressure balancing means from said second tank section to the first tank section when said pressure differential exceeds said preselected amount, said check valve means including a sealing means for separating and sealing the first tank section from the second tank section;

b. a rerovable filter assembly disposed within said first tank section, said filter assembly comprised of a manifold assembly and a plurality of like, vertically disposed filter grid units of cylindrical shape;

said manifold assembly including a cylindrical hub having a plurality of detachably connected radial support arms and a conduit arm extending therefrom in a plane perpendicular to the longitudinal axis of the hub, said conduit arm being in fluid communication with said outlet port in said first tank section, said support arms having openings uniformly disposed in upper surfaces thereof adapted to be detachably connected to ends of said filter grid units;

each of said filter grid units having a rigid, nonbendable and perforated plastic tubular inner sleeve enclosed within a fine resh plastic tubular outer sleeve capable of passing water and retaining diatomaceous earth Particles in its interstices, the perforations being uniformly spaced circumferentially and longitudinally about said inner sleeve, said inner sleeve being coaxial with said outer sleeve and fixedly disposed relative thereto and forming said unitary grid unit therewith, said filter grid units having imperforate tops and bottom connecting means which are adapted to threadably connect said units with said opening in said support arms;

said filter unit and manifold assembly being disposed in a flow path of a liquid passing into and out of said first tank section;

c. a pump in fluid communication with an inlet line for the liquid to be filtered, with said inlet and outlet ports in said first and second tank sections, and with associated return and waste lines for said first and second tank sections, said pump means being capable of causing said liquid to flow into and out of respective inlet and outlet ports of said first and second tank section, repectively, through said filter unit and manifold assembly and/or said sand bed and out through return or waste lines, or from said first tank section to said second tank section, and further being capable of causing said liquid to by-pass said first and/or second tank sections and flow out of said return or waste lines:

d. a first multifunctional valve means in fluid communication with said pump means, with said ports in said first tank section and with return and waste lines associated therewith and having:

a first control means having open and closed states and capable of controlling the flow of said liquid into the inlet port of said first tank section through said filter unit and manifold assembly and the outlet port of said first tank sections, and out through the return line of said first valve neans;

a second control means having open and closed states and capable of controlling the flow of said liquid into the outlet port of said first tank section, through said filter unit and manifold assembly and said inlet port of said first tank section, and out through the waste line of said first valve means:

a third control means having open and closed states and capable of controlling the flow of said liquid by-passing said first valve means;

a fourth control means having open and closed states and capable of controlling the flow of said liquid by-passing said first tank section out of the waste line of said first valve means; and means for moving each of said first, second, third and fourth control means between their respective open and closed states.

e. a second multifunctional valve means in fluid communication with said pump means, with said ports in said second tank section and with return and waste lines associated therewith and with first and second inlet lines for said first valve means, and having:

a first control means having open and closed states and capable of controlling the flow of said liquid into the inlet port of said second tank section through said sand bed and the outlet port of said second tank section, and out through the return line of said valve means;

a second control means having open and closed states and capable of controlling the flow of said liquid into the outlet port of said second tank section, through said sand bed and said inlet port of said second tank section, and out through the waste line of said second valve means;

a third control means having open and closed states and capable of controlling the flow of said liquid into the inlet port of said second tank section through said sand bed and the outlet port of said second tank section, and out through a first inlet line of said first valve means;

a fourth control means having open and closed states and capable of controlling the flow of said liquid by-passing said second tank section out of the return line of said second valve means;

a fifth control means having open and closed states and capable of controlling the flow of said liquid by-passing said second tank section and out through a second inlet line of said first valve means; and a sixth control means having open and closed states and capable of controlling the flow of said liquid by-passing said second tank section and out of the waste line of said second valve means.

* * * * *